No. 872,213. PATENTED NOV. 26, 1907.
S. R. BAILEY.
BATTERY SUPPORT FOR AUTOMOBILES.
APPLICATION FILED JAN. 4, 1907.
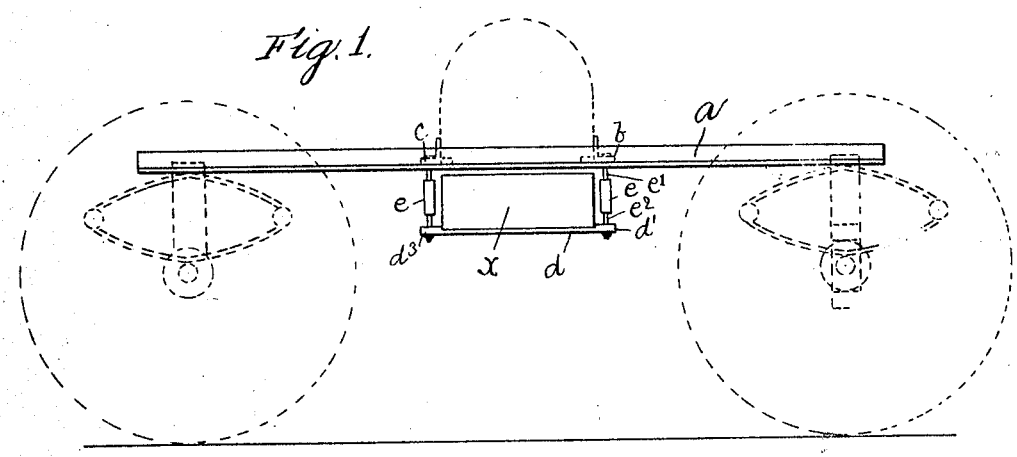
Fig. 1.
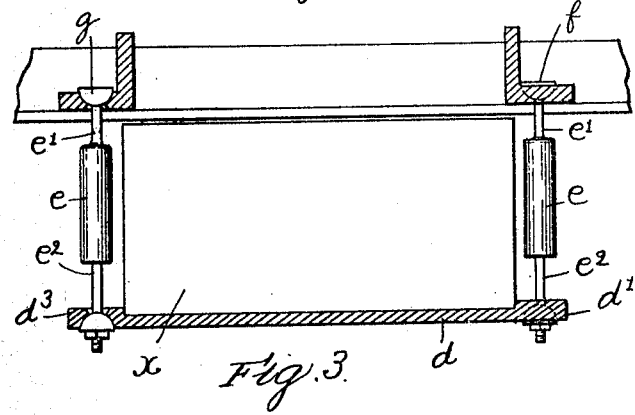
Fig. 2.
Fig. 3.
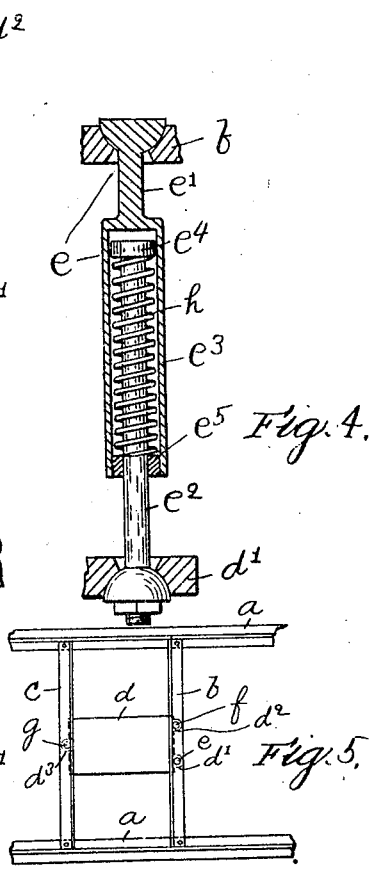
Fig. 4.
Fig. 5.
Witnesses:
H. B. Davis.
Cynthia Doyle.
Inventor.
Sam'l R. Bailey
by Byrs & Kinnican
Attys.

UNITED STATES PATENT OFFICE.

SAMUEL R. BAILEY, OF AMESBURY, MASSACHUSETTS.

BATTERY-SUPPORT FOR AUTOMOBILES.

No. 872,213.

Specification of Letters Patent.

Patented Nov. 26, 1907.

Application filed January 4, 1907. Serial No. 350,734.

*To all whom it may concern:*

Be it known that I, SAMUEL R. BAILEY, of Amesbury, county of Essex, State of Massachusetts, have invented an Improvement in Battery-Supports for Automobiles, of which the following description, in connection with the accompanying drawings, is a specification, like characters on the drawings representing like parts.

In electrically propelled automobiles or cars it is necessary to carry a set of storage batteries which are, relatively to the weight of the car, very heavy, so that the inertia which must be overcome on their account in starting or stopping the car is of considerable consequence. The strain on the motor, and other parts, due to inertia, is far from inconsiderable and it is desirable to prevent this strain as far as possible. As a car is tilted in passing over inequalities in the road, more or less power is expended in raising the parts carried by the car body and it is obviously desirable to prevent this loss of power to as great an extent as possible.

The object of my invention is to provide means whereby the necessity of simultaneously overcoming the inertia of the storage batteries and the car body is avoided, and, to an extent, to prevent waste of power which is expended in raising and lowering the batteries as portions of the car body are raised higher than other portions thereof in passing over inequalities in the road. I accomplish these objects by providing means whereby universal swinging motion of the storage batteries with relation to the frame of the car is permitted, so that the force of inertia of the batteries and of the car does not have to be overcome simultaneously, and so that the extent which the batteries will be lifted by the tilting of the car will be reduced.

For an understanding of the means which I employ in carrying out my invention reference is made to the accompanying drawing, in which, Figure 1 is a side elevation of an automobile frame provided with my invention. Fig. 2 is a plan view of the battery support, and Fig. 3 is a central cross section thereof on the line 3—3, Fig. 2. Fig. 4 is a detail view of one of the supporting parts, and Fig. 5 is a plan view of a portion of the frame.

The body supporting frame of the automobile comprises two side bars $a$ and a series of connecting cross-bars, two bars $b$, $c$ being shown. The battery supporting means preferably comprises a base plate $d$ on which the box $x$ containing the battery cells is placed. Said base piece $d$ is suspended from the cross-bars $b$ and $c$ by means of three suspension rods $e$, $f$ and $g$, the suspension rods $e$ and $f$ being shown as connected at their upper ends to the cross-bar $b$, and at their lower ends to the rearwardly projecting ears $d'$, $d^2$ on the base piece $d$, at the rear corners thereof, and the supporting rod $g$ being shown as connected at its upper end to the middle of the cross-bar $c$ and at its lower end to a forwardly projecting ear $d^3$ on the base plate $d$ at the middle of its front end. Each suspension rod is of the same construction and is connected to the cross-bars and ears in the same manner, so that a description of one will suffice.

The rod $e$ is shown in detail in Fig. 4 and comprises two rod sections $e'$, $e^2$, each of which are provided with heads having oppositely disposed semi-spherical faces adapted to seat into correspondingly shaped recesses formed in the cross-bar and ear $d'$ respectively, to which they are connected, each having apertures therethrough, leading from the bottom of said recesses through which said sections $e'$, $e^2$ pass and which are of sufficient size to permit said sections to swing therein in any direction. The upper section $e'$ is provided with an inverted, hollow, cylindrical section $e^3$ at its lower end and the lower section $e^2$ is provided with a head $e^4$ at its upper end which is fitted to slide freely in said cylinder. A spring $h$ is mounted on the section $e^2$ and interposed between said head $e^4$ and a ring $e^5$ secured in the lower end of cylinder $e^3$, through which section $e^2$ passes. This particular construction of spring connection forms no part of my invention, as various other forms of spring connection may be employed with equal advantage. As the construction shown in Fig. 4 is employed in all of the suspension rods, a spring support is thus provided for the battery base.

With the above described construction the battery support is free to swing in any direction, so that when the car is started suddenly, said support may swing to the rear, so that the inertia of both the car body and the batteries do not have to be overcome at the same instant, thereby avoiding the sudden shock which would be placed on the motor in starting. In suddenly stopping the reverse action takes place, the battery support being also adapted to swing forwardly, so that the inertia of the car body is overcome first. The battery support is also preferably suspended in the middle of the car body and as low as possible, so that the work expended in merely raising and lowering the batteries, as when one wheel is lifted by an obstruction or unevenness in the road without lifting the other wheels, or the wheels on one side only are lifted without lifting them on the other side, is more nearly equalized than if the battery were supported at one side of the frame. This loss is, however, to a material extent prevented by the transverse swinging of the battery support, as one side or corner of the car body is raised higher than other portions thereof. That is, with my form of suspending means the battery support may swing away from any portion which is lifted higher than the rest, so that the batteries are not lifted to the extent which they would be if they were held immovable with relation to the frame.

While I have shown a series of three suspension rods, it being necessary to provide three if the batteries are to be supported below their center of gravity, it will be apparent that a greater number may be employed if desired, but I consider the employment of two rods adjacent the corners at one end, and one in the middle at the other end, far more advantageous than to provide one support at each corner, for the reason that the lifting effect on the battery support, resulting from lifting separately either of the corners adjacent the end at which the single suspension rod is provided is much less than if the support were suspended at each corner. The extent which the support will be lifted upon the flexure or yielding of the frame as one wheel passes over an obstruction is also less when suspended as described than it would be if it were suspended at each corner.

Having thus described my invention, what I claim as new and desire to secure by Letters Patent is:—

1. In combination with an automobile frame, a base adapted to support the batteries thereon, a series of three suspension rods having heads at each end provided with oppositely disposed spherical shaped faces, said frame and said base each having apertures, through which said rods pass loosely, and having oppositely disposed recesses about said apertures, the bottoms of which are adapted to receive the spherical faces of said heads to permit said base to swing freely in any direction with relation to said frame, as and for the purpose set forth.

2. In combination with an automobile frame, a battery support and means for suspending the same at points below its center of gravity comprising a pair of suspension rods connected to said base adjacent opposite sides and one end thereof, and a third rod connected to said base at the opposite end and adjacent the middle thereof, said rods being connected to said frame at their upper ends, said suspending means permitting free universal swinging movement of said support with relation to said frame, substantially as described.

3. In combination with an automobile frame, a battery support and means for suspending the same at points below its center of gravity comprising a pair of suspension rods connected to said base adjacent opposite sides and one end thereof, and a third rod connected to said base at the opposite end and adjacent the middle thereof, said rods being connected to said frame at their upper ends, substantially as described.

In testimony whereof, I have signed my name to this specification, in the presence of two subscribing witnesses.

SAMUEL R. BAILEY.

Witnesses:
L. H. HARRIMAN,
H. B. DAVIS.